United States Patent Office 3,141,029
Patented July 14, 1964

3,141,029
16α-ALKOXY-6-DEHYDROCORTICAL
HORMONES
Howard J. Ringold and Albert Bowers, Mexico City, Mexico, assignors, by mesne assignments, to Syntex Corporation, a corporation of Panama
No Drawing. Filed July 29, 1959, Ser. No. 830,211
Claims priority, application Mexico July 29, 1958
20 Claims. (Cl. 260—397.45)

This invention relates to certain new cyclopentanoperhydrophenanthrene derivatives and to a process for producing the same.

More particularly, it relates to novel 16α-alkoxycortical hormones, and more specifically to the 16α-alkoxy(methoxy, ethoxy, propoxy) derivatives of cortisone, hydrocortisone, prednisone and prednisolone, to their 9α-halo(fluoro, chloro or bromo) analogs and to the 21-esters of the aforementioned compounds, which have an additional double bond between C–6 and C–7 and are free from or have substituents at one or both of the positions C–2 and C–6, which substituents are at the α-position in the compounds saturated between C–1 and C–2 or between C–6 and C–7, respectively; substituents at C–2 can be the methyl or ethyl group, and substituents at position C–6 can be the methyl group or a fluorine, chlorine or bromine atom.

The new compounds, object of the present invention, are cortical hormones having a marked anti-inflammatory, thymolytic, anti-androgenic and anti-estrogenic activity.

These compounds are characterized by the following general formula:

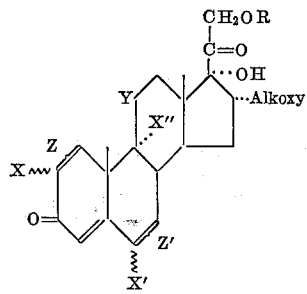

wherein R is selected from the group consisting of hydrogen and hydrocarbon acyl radicals, preferably having maximally 12 carbon atoms, X is selected from the group consisting of hydrogen, methyl and ethyl, X' is selected from the group consisting of hydrogen, methyl, fluorine, chlorine and bromine, X'' is selected from the group consisting of hydrogen, fluorine, chlorine, and bromine, Y can be =O or

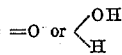

and Z is selected from the group consisting of a single bond between C–1 and C–2 and a double bond between C–1 and C–2, and Z' is selected from the group consisting of a single bond between C–6 and C–7 and a double bond between C–6 and C–7.

The process for producing these new compounds according to our invention can be illustrated by the following equation:

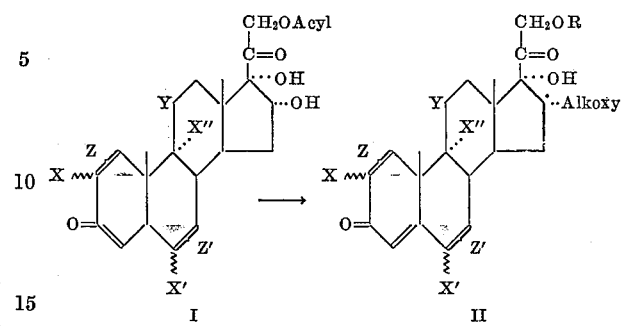

In the above equation R, X, X', X'', Y, Z and Z' represent the same groups as described further above; acyl represents a radical of any hydrocarbon carboxylic acid having up to 12 carbon atoms per molecule, which acid may be saturated or unsaturated, of straight or branched chain, cyclic or mixed cyclic-aliphatic, and may be unsubstituted or substituted by methoxy, halogen or other groups. "Alkoxy" represents the lower radicals such as methoxy, ethoxy, propoxy and the like up to 5 carbon atoms per radical.

The starting compounds I are available from different sources. Thus the compound in which Z is a single bond and X' is hydrogen is manufactured by Lederle Co. and is commercially available under the name of Triamcinolone, having the formula:

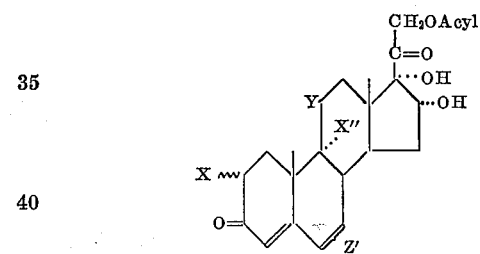

6 - bromo - 9α fluoro - 1,4 - pregnadiene - 11β,16α, 17α-21-tetrol-3,20-dione 16,21 diacetate is disclosed in Patent No. 2,814,631 to Gould.

The production of those of the starting compounds which have the above general Formula I

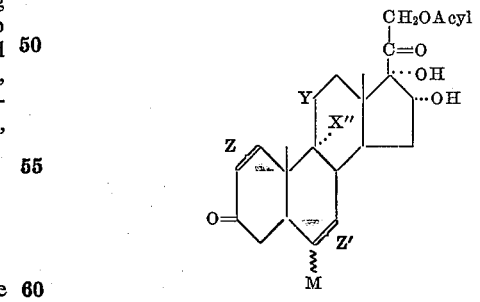

IA: Z=C—C, Z'=C—C
IB: Z=C=C, Z'=C—C
IC: Z=C—C, Z'=C=C
ID: Z=C=C, Z'=C=C and in which X is hydrogen, M is chlorine or bromine and Z and Z' single or a double bond, and which will be designated as IA, IB, IC and ID hereinafter, can be achieved by the processes described in the co-pending patent applications Serial Nos. 670,366 and 670,368, both filed on July 8, 1957, and 740,550, filed June 9, 1958, now U.S. Patent No. 2,934,546, and assigned to the same assignee as the present application and by the subsequent microbiological introduction of a free hydroxyl group at C-16 in α-configuration as described in the co-pending application Serial No. 830,212, filed July 29, 1959, now abandoned.

The production of these new compounds can be illustrated by the following Reaction Diagram I:

REACTION DIAGRAM I

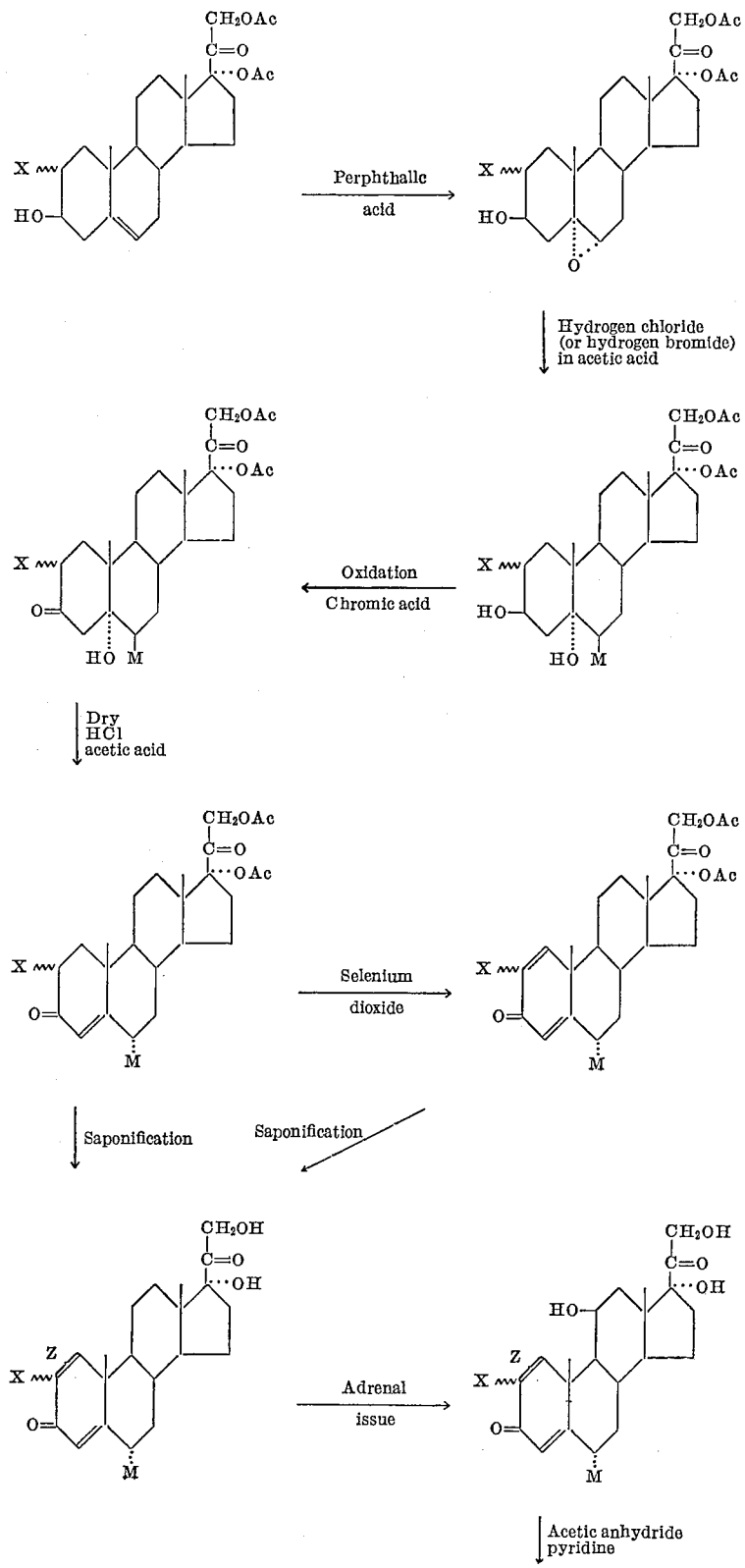

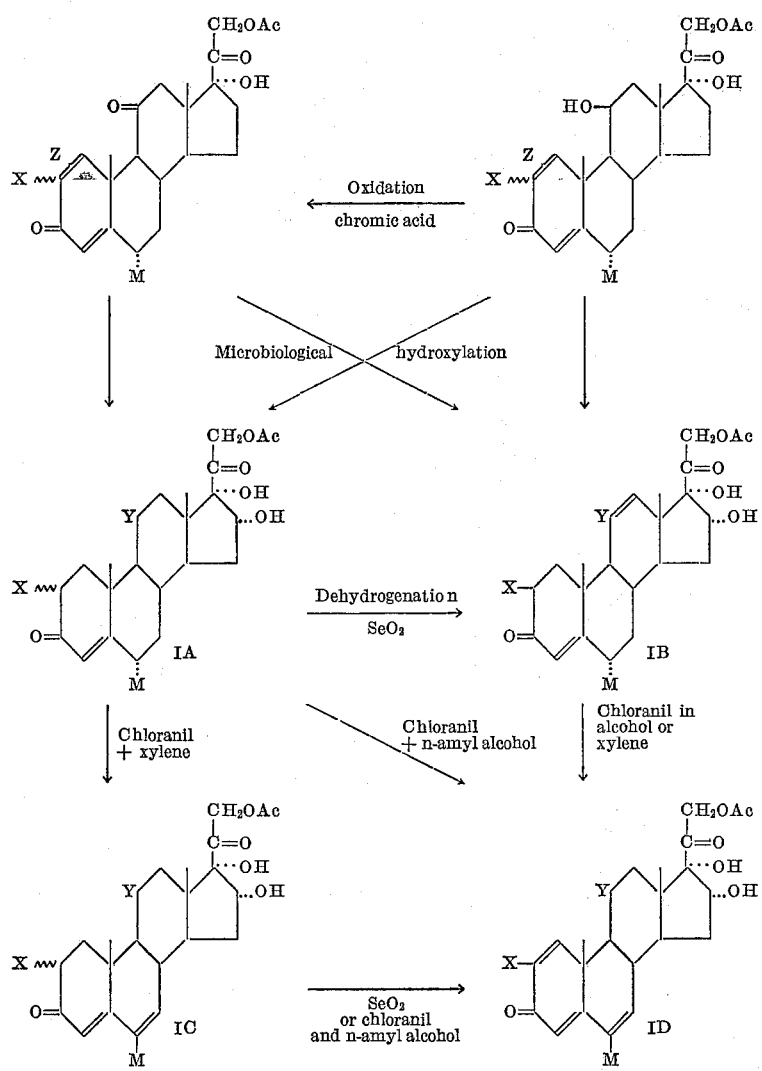

In the above equations Ac represents the acetate radical or any other corresponding lower fatty acid ester radical, M represents chlorine or bromine, and X and Z represent the same groups as heretofore set forth. In practising the process above set forth, the 17α,21-diacetate or other lower fatty acid ester of Δ⁵-pregnene-3β,17α,21-triol after oxidation with monoperphthalic acid affords the corresponding 17,21-diacetate or other ester of 5α,6α-epoxido-pregnane-3β,17α,21-triol-20-one. This epoxide is then subjected to halogenation with dry hydrogen chloride or bromide in acetic acid to obtain the corresponding 17,21-diacetate of 6β-chloro(or bromo)-pregnane-3β,5α,17α,21-tetrol-20-one. The 3β-hydroxyl group is then oxidized to a keto group by reaction with concentrated chromic acid. When, for instance, the 17,21-diacetate of 6β-chloro-pregnane-5α,17α,21-triol-3,20-dione is dehydrated at C-5 by reaction with dry hydrogen chloride in acetic acid solution there is formed the diacetate, or other lower fatty acid ester. If another ester has been used in the reaction, of 6α-chloro-Δ⁴-pregnene-17α,21-diol-3,20-dione. This compound may be converted to the corresponding 1-dehydro-"S" derivative by treatment with selenium dioxide. After saponification of the diacetates (with or without double bond in 1, 2 position) an 11β-hydroxy group can be introduced by incubation with adrenal tissue under the conditions set forth in U.S. Patent No. 2,671,752, granted March 9, 1954, to Alejandro Zaffaroni, whereby 6α-chloro-hydrocortisone and 6α-chloro-prednisolone are formed. 11β-hydroxyl derivatives thus prepared may then be oxidized with chromic acid to form the corresponding cortisone or prednisone type derivatives, namely, 6α-chloro(or bromo)-cortisone and 6α-chloro(or bromo)-prednisone.

The respective 6-bromo-derivatives are obtained in the same manner.

The above 6α-chloro-Δ⁴-pregnene-17α,21-diol-3,11,20-trione 21-acetate or 6α-chloro-Δ¹,⁴-pregnadiene-17α,21-diol-3,11,20-trione, or the corresponding compounds of the above formulas in which Y is β-hydroxyl, are then saponified and the free alcohols microbiologically hydroxylated at C–18, by incubation with *Streptomyces roseochromogenus*. After conventional re-esterification, for instance with acetic acid, the resulting starting compounds IA and IB are thus: 6α-chloro-(or bromo)-Δ⁴-pregene-16α,17α,21-triol-3,11,20-trione 21-acetate, 6α-chloro(or bromo)Δ⁴-pregnene-11β,16α,17α,21-tetrol-3,20-dione 21-acetate, 6α-chloro(or bromo)-Δ¹,⁴-pregnadien-16α,17α,21-triol-3,11,20-dione 21-acetate, or 6α-chloro(or bromo)-Δ¹,⁴-pregnadien-11β,16α,17α,21-tetrol-3,20-dione 21-acetate or other 21-esters.

Of these intermediates, those having the general Formula IA can be further converted to the above-mentioned starting compounds IB, and to IC and ID by the further steps shown in the above Reaction Diagram I as described hereinafter:

The preferred intermediate IA is one where R represents the acetate radical. Refluxing with selenium dioxide preferably in mixture with t-butanol in the presence of pyridine gave the corresponding diene compounds (IB), and refluxing these dienes with chloranil in n-amyl alcohol or xylene gave the corresponding 21-acetate of $\Delta^{1,4,6}$-trienes (ID). These last compounds were also obtained directly from the $\Delta^4$ starting materials by refluxing with chloranil in n-amyl alcohol. Refluxing the $\Delta^4$ starting compounds with chloranil in xylene however, produced the $\Delta^{4,6}$-derivatives (IC) indicated which could be transformed to the $\Delta^{1,4,6}$-derivatives (ID) by a second treatment with chloranil in n-amyl alcohol or by refluxing with selenium dioxide. As may be understood, other esters of the type previously set forth may be used instead of the acetates and the $\Delta^{4,6}$, $\Delta^{1,4}$ and $\Delta^{1,4,6}$ ester compounds prepared may be conventionally saponified and reesterified.

Another possible process of producing the above-mentioned starting compounds in which M is chlorine or bromine and X and X'' is hydrogen is described in the co-pending applications Serial Nos. 670,366 and 670,368, both filed on July 8, 1957, as well as Serial No. 830,212, filed July 29, 1959, now abandoned, and comprises the steps illustrated in the following Reaction Diagram II:

REACTION DIAGRAM II

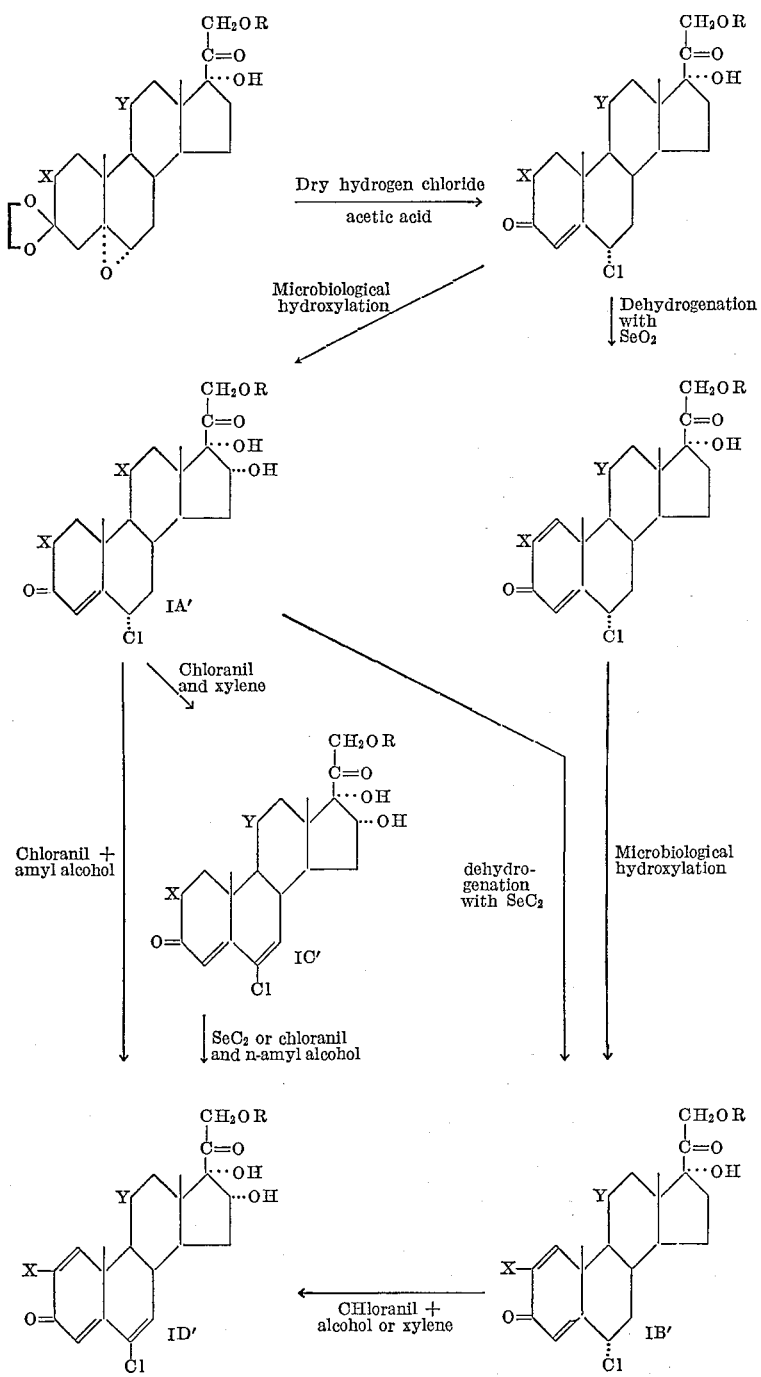

Referring to the equation, for the first step, when the 11 position is occupied by a keto group, the 21-acetate of 3-ethylene - dioxy-5α6α-oxido-pregnan-17α21-diol-11,20-dione (prepared from cortisone acetate as set forth by Sondheimer, Mancera and Rosenkranz, J.A.C.S., 76, 5020 (1954) is suspended in glacial acetic acid and a slow stream of dry hydrogen chloride is passed into the suspension. Desirably, the temperature is kept below room temperature and preferably close to the freezing point of glacial acetic acid or below 15° C. The hydrogen chloride is passed into the reaction mixture for a period of time of the order of 2 hours and the resulting solution is then poured into ice water. The product after usual extraction with an organic solvent and purification is the 21-acetate of 6α-chloro-Δ⁴-pregnen-17α,21-diol-3,11,20-trione. Although the acetate was found desirable as the starting material it is obvious that other esters of the character described may be used as starting materials with the consequent production of corresponding esters of the product. These other ester starting materials may be prepared from the corresponding esters of cortisone.

The 21-esters of 6α-chloro-Δ⁴-pregnen-17α,21-diol-3,11,20-trione preferably the lower fatty acid esters such as the acetate upon heating in an organic solvent (a preferred medium was t-butanol having a catalytic amount of pyridine) with selenium dioxide for a prolonged period of time of the order of 70 hours and purification gave the corresponding 21-ester of 6α-chloro-Δ¹,⁴-pregnadien-17α, 21-diol-3,11,20-trione. Here again saponification gave the free compounds and esterification other hydrocarbon carboxylic esters of 2 to 12 carbon atoms.

The further microbiological hydroxylation of the two last mentioned compounds to the corresponding 16α-hydroxy derivatives and the conversion of intermediate IA', a starting material for the process of the present invention, to starting materials IB', IC', and ID' is identical with the process steps described in connection with Reaction Diagram I.

Starting materials IA'', IB'', IC'' and ID'' which are suitable for use in the process described in the present invention and have the above-mentioned general Formula I in which the substituent in 6α-position is hydrogen, methyl, or fluorine, can be produced by the process described in the co-pending application Serial No. 762,232, filed September 22, 1958, and assigned to the same assignee as the present application. This process comprises the steps shown in the reaction diagram below:

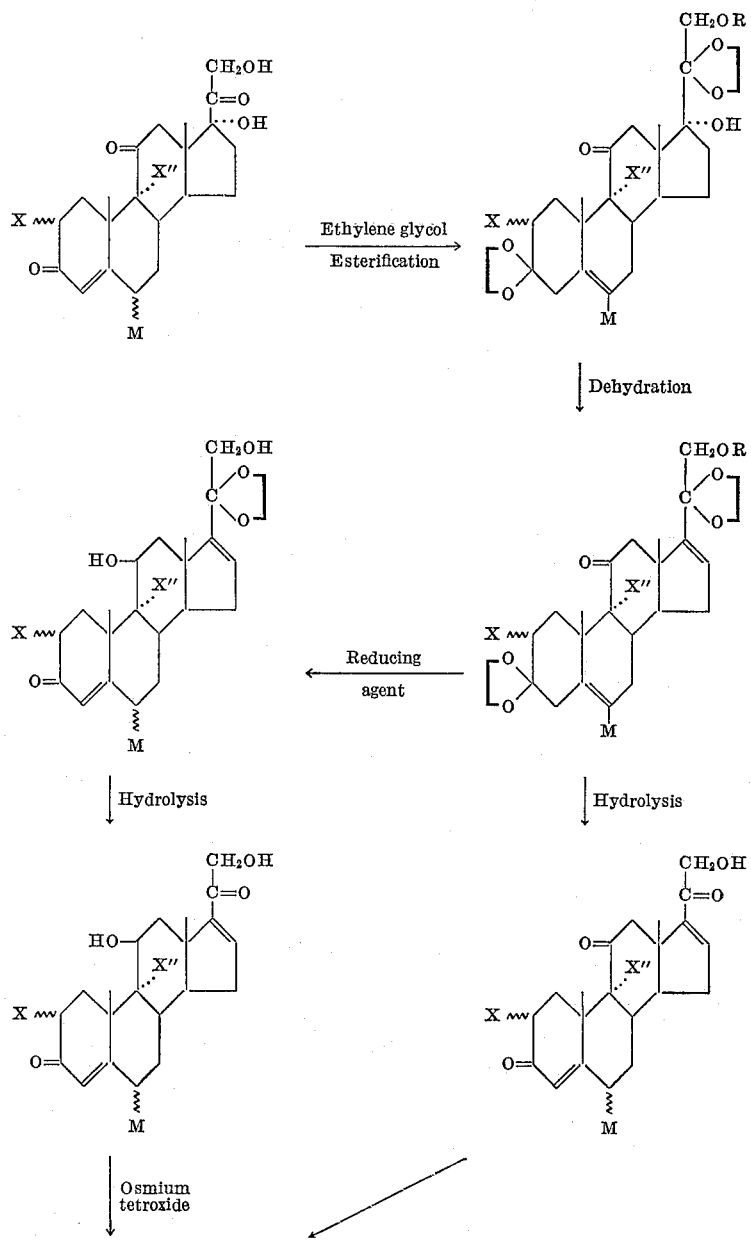

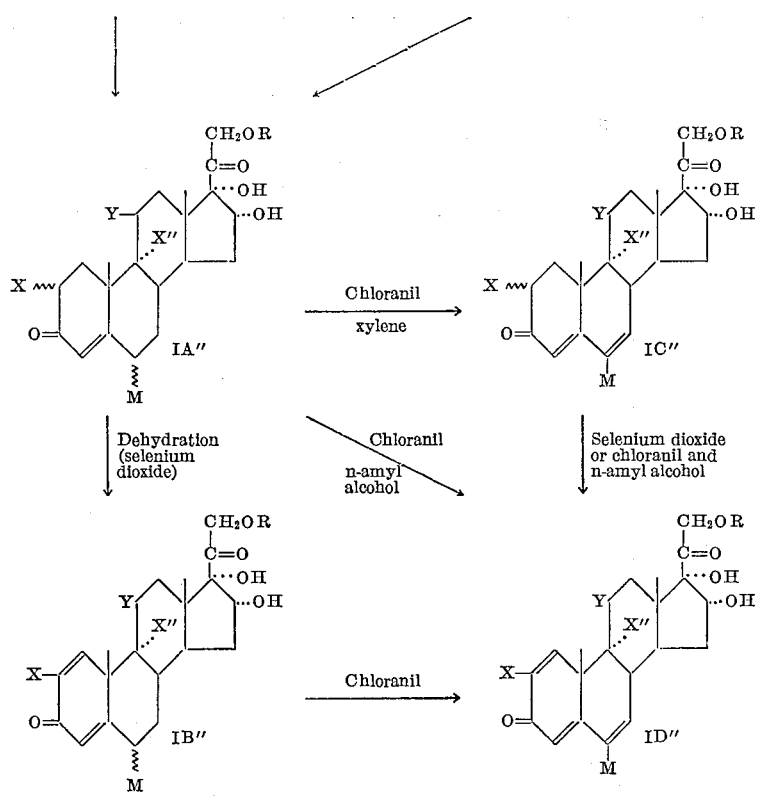

In the above reaction diagram X, X″, Y and R represent the same groups as heretofore set forth. M represents either hydrogen, methyl or fluorine.

In practicing the process outlined in this second diagram, a known compound which is either cortisone, a 9α-halogenated cortisone in which the halogen can be fluorine, chlorine or bromine, 6α-methyl cortisone or one of the aforesaid 9α-halogenated cortisone derivatives having the methyl group as a substituent at C–6, or 6α-fluorocortisone, or one of the aforesaid 9α-halogenated cortisone derivatives having the methyl group as a substituent at C–6, is conventionally refluxed with ethylene glycol in the presence of benzene and p-toluenesulfonic acid to form the corresponding 3,20-bis-cycloethyleneketals thereof. The bis-ketals were then conventionally acylated at C–21 to form conventional esters as indicated in the equation. The esters were then reacted with thionyl chloride in pyridine solution to form the corresponding 21-acylate of unsubstituted or 6-substituted 3,20-bis-ethylenedioxy-Δ$^{5,16}$-pregnadien-21-ol-11-one, or its 9α-fluoro or 9α-chloro analogue. The acyl group was then saponified by reaction with an alkali metal hydroxide under mild conditions and the ketal groups hydrolyzed with acid to prepare, for instance, when M is fluorine, 6α-fluoro-, 6α-fluoro-9α-chloro- or 6α,9α-difluoro-Δ$^{4,16}$-pregnadien-21-ol-3,11,20-trione. The corresponding compounds having an 11β-hydroxy group were prepared by reducing the 11-keto group of the last mentioned 3,20-bis-ethylenedioxy derivatives with lithium aluminum hydride. Reaction of Δ$^{4,16}$-compounds having either an 11-keto or 11β-hydroxy group with osmium tetroxide under the conditions described by Bernstein et al. (J.A.C.S. 78, 1909 (1956)) yielded the intermediates of the general formula IA″, namely, if M is fluorine, 6α-fluoro-Δ$^4$-pregnen-16α,17α,21-triol-3,11,20-trione, 6α,9α-difluoro-Δ$^4$-pregnen-16α,17α,21 - triol - 3,11,20-trione and 6α-fluoro-9α-chloro-Δ$^4$-pregnen-16α,17α,21-triol-3,11,20-trione as well as the 11β-hydroxy derivatives namely 6α-fluoro-, 6α,9α-difluoro- and 6α - fluoro - 9α-chloro-Δ$^4$-pregnen-11β,16α,17α,21-tetrol-3,20-dione or the 21-esters thereof. If M is the methyl group, there are obtained the 6α-methyl corresponding compounds.

The reaction of all of these compounds with selenium dioxide in t-butanol yielded the corresponding Δ$^{1,4}$-dienes IB″. Preferably this reaction was effected with the compounds in the form of their 21-monoesters followed by subsequent conventional saponification to form the free dienes.

All of the above compounds upon conventional esterification yield the corresponding 21-mono esters of the type previously set forth, using only a slight excess of acid anhydride.

The unsubstituted or 6-substituted starting compounds IC′ and ID′ of the present invention are obtained from intermediates IA″ or IB″ by reactions with chloranil as described above in connection with the first reaction diagram for the 6-chlorinated compound.

The 16-hydroxy derivatives constituting the starting materials of the present invention can also be obtained by microbiological hydroxylation of the corresponding known 16-unsubstituted derivatives of cortisone, hydrocortisone, prednisone and prednisolone. By incubation of one of the aforesaid 16-unsubstituted compounds with *Streptomyces roseochromogenus*, a hydroxyl group is introduced in 16α-position in these compounds.

According to the process of our present invention, the novel compounds of the invention are obtained from a 21-ester of the respective 16α-hydroxy compound (I) by reaction with a diazoalkyl (diazomethane, dioazoethane or diazopropane) in the presence of a catalyst such as boron trifluoride etherate or fluoro-boric acid HBF$_4$. Preferably we employed fluoroboric acid and conducted the reaction with an excess of the diazoalkyl, at room temperature and in mixture with methylene chloride and ether, although the reaction can be carried out in other solvents such as ether, acetone or mixtures of both. The use of fluoroboric acid has been described by Caserio, Roberts, Neeman and Johnson, J. Am. Chem. Soc., 80, 2584 (1958).

Thus we obtained the corresponding 21-esters of the respective 16α-alkoxy compounds II in which R is acyl. The ester group was then hydrolyzed, preferably by treatment with dilute methanolic solution of sodium methoxide or potassium hydroxide, at low temperature and under an atmosphere of nitrogen, to produce the respective 21-hydroxy compounds II in which R is H. The hydroxyl group at C–21 was reesterified by reaction with the anhydride of a carboxylic acid in pyridine solution.

The ester groups at C–21 of I and II may be formed with the radical of any of the above-mentioned carboxylic acids. The esters of II are obtained either starting from the corresponding 21-ester of I or by using the anhydride of the corresponding acid in the step of reesterification. We prepared, among others, the following: 21-esters of II: acetates, propionates, t-butyrates, hemisuccinates, enanthates, caproates, benzoates, trimethylacetates, phenoxyacetates, cyclopentylpropionates, phenylpropionates and β-chloropropionates.

To name a few particular examples of practicing the process of the invention, use of the 21-esters of 16α-hydroxy-prednisone or of 16α-hydroxy-prednisolone, with or without the respective substitutes at C–2α, C–6α and C–9α as starting materials affords the corresponding 21-esters of the respective 16α-alkoxy-prednisones and 16α-alkoxy-prednisolones, with or without the corresponding substituents at C–2, C–6α, and C–9α.

Use of the 21-esters of $\Delta^{4,6}$-pregnadiene-16α,17α,21-triol-3,11,20-trione or of $\Delta^{4,6}$-pregnadiene-11β,16α,17α,21-tetrol-3,20-dione, with or without the respective substituents at C–2α, C–6 and C–9α as starting materials leads to the production of the corresponding 21-esters of the respective 16α-alkoxy-$\Delta^{4,6}$-pregnadiene-17α,21-diol-3,11,20-triones or 16α-alkoxy-$\Delta^{4,6}$-pregnadiene-11β,17α,21-triol-3,20-diones, with or without the corresponding substituents at C–2α, C–6 and C–9α.

And if the 21-esters of $\Delta^{1,4,6}$-pregnatriene-16α,17α,21-triol-3,11,20-trione and of $\Delta^{1,4,6}$-pregnatriene-11β,16α,17α,21-tetrol-3,20-dione, with or without the respective substituents at C–2, C–6 and C–9α are used as starting materials, there are obtained the corresponding 21-esters of the respective 16α-alkoxy-$\Delta^{1,4,6}$-pregnatriene-17α,21-diol-3,11,20-triones and 16α-alkoxy-$\Delta^{1,4,6}$-pregnatriene-11β,17α,21-triol-3,20-diones, with or without the corresponding substituents at C–2, C–6 and C–9α.

The invention shall now be illustrated by a number of more specific preparations and examples which are, however, not intended as limitative of the scope of the invention.

PREPARATION I 1.5 mols of perphthalic acid in ether was added to a solution of 5 g. of the 17,21-diacetate of $\Delta^5$-pregnene-3β,17α,21-triol-20-one in 100 cc. of chloroform and the mixture was kept for 20 hours at room temperature. After dilution with water, the organic layer was separated, washed with water, sodium bicarbonate solution and water to neutral, dried over anhydrous sodium sulfate, filtered and evaporated to dryness under reduced pressure. Crystallization of the residue from acetone-hexane afforded the 17,21-diacetate of 5α,6α-oxido-pregnane-3β,17α,21-triol-20-one, M.P. 198–200° C., $[\alpha]_D$ −54° (chloroform). A slow stream of dry hydrogen chloride was bubbled for two hours into a solution 5 g. of the preceding epoxide in 200 cc. of chloroform while the temperature was maintained below 10° C., the mixture was diluted with water and the chloroform layer was separated and washed with water, until neutral, dried over anhydrous sodium sulfate and evaporated to dryness. Crystallization of the residue from acetone-hexane furnished the 17α,21-diacetate of 6β-chloro-pregnane-3β,5α,17α,21-tetrol-20-one.

A solution of 3 g. of this tetrolone in 150 cc. of acetone was treated with an 8-normal solution of chromic acid prepared by mixing 1.6 g. of chromium trioxide with concentrated sulfuric acid and water. This oxidizing reagent was added dropwise to the stirred solution while the temperature was maintained below 0°, in the course of 2 minutes. The stirring was continued for 5 minutes further at 0° C. and then the solution was diluted with water and extracted with ether. The ether extract was washed with water, dried over anhydrous sodium sulfate and evaporated to dryness. The residue crystallized from acetone-hexane to produce the 17,21-diacetate of 6β-chloro-pregnane-5α,17α,21-triol-3,20-dione.

2 g. of the 17,21-diacetate of 6β-chloro-pregnane-5α,17α,21-triol-3,20-dione was dissolved in 100 cc. of glacial acetic acid and a slow stream of dry hydrogen chloride was passed into the solution for 2 hours at a temperature around 18° C. The mixture was poured into ice water, the precipitate formed was collected and washed with water, dried and crystallized from acetone-hexane. There was thus produced the diacetate of 6α-chloro-$\Delta^4$-pregnene-17α,21-diol-3,20-dione, ultraviolet absorption λ max., 236 mμ, log ε 4.22. When the starting material was other 17,21-diesters of $\Delta^5$-pregnen-3β,17α,21-triol-20-one, the corresponding 17,21-diesters of 6α-chloro "S" were obtained. These were the dipropionate, dicaproate and dibenzoate.

1 g. of the 17,21-diacetate of 6α-chloro-"S" obtained as has been described above, was suspended in 10 cc. of 1% methanolic potassium hydroxide previously cooled to 0° C. The mixture was stirred for 2 hours at 0° C., under an atmosphere of nitrogen, neutralized with acetic acid, diluted with water and the precipitate was filtered, washed with water, dried and crystallized from acetone-hexane. There was thus obtained the free 6α-chloro-$\Delta^4$-pregnene-17α,21-diol-3,20-dione, i.e., 6α-chloro-"S."

A mixture of 5 g. of the diacetate of 6α-chloro-$\Delta^4$-pregnene-17α,21-diol-3,20-dione, 250 cc. of anhydrous t-butanol, 1.5 g. of selenium dioxide and 0.5 cc. of pyridine was refluxed for 70 hours under an atmosphere of nitrogen, cooled, diluted with ethyl acetate and filtered through celite; the filter was washed with hot ethyl acetate and the combined filtrate and washings was evaporated to dryness under reduced pressure. The residue was triturated with water, the precipitate was collected, dried and purified by chromatography over 250 g. of washed alumina. Elution of the column with benzene-ether and ether and evaporation to dryness of the fractions afforded crystalline products which were combined and recrystallized from acetone-hexane, thus producing the diacetate of 6α-chloro-$\Delta^{1,4}$-pregnadiene-17α,21-diol-3,20-dione. Other esters of hydrocarbon carboxylic acids of 2 to 12 carbon atoms were also thus prepared such as the dipropionate and dicaproate.

A suspension of 2 g. of the diacetate of 6α-chloro-$\Delta^{1,4}$-pregnadiene-17α,21-diol-3,20-dione in 20 cc. of absolute methanol was mixed with a solution of sodium methoxide in methanol prepared by dissolving 120 mg. of sodium in 5 cc. of absolute methanol; the addition was carried out with stirring under an atmosphere of nitrogen at 0° C. The stirring was continued under nitrogen for 2 hours at 0° C., and then the mixture was poured into 50 cc. of water containing 1 cc. of acetic acid, the precipitate was filtered, washed with water, dried and recrystallized from acetone-hexane, thus producing the free 6α-chloro-$\Delta^{1,4}$-pregnadiene-17α,21-diol-3,20-dione.

The following solutions "A," "B" and "C" were prepared using distilled water as solvent: solution "A" was prepared by mixing 425 cc. of a 1.742% dipotassium hydrogen phosphate solution ($K_2HPO_4$) with 75 cc. of 1.38% monosodium dihydrogen phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

The fat was removed from the adrenal glands obtained from recently slaughtered bovine and the glands were ground in a meat grinder until an homogeneous mass was obtained; 3 kg. of this mass was then added to 6 lt.

of the mixture of solutions "A," "B" and "C," obtained as described above, and the mixture was vigorously stirred.

There was then added 3 g. of 6α-chloro-Δ⁴-pregnene-17α,21-diole-3,20-dione in 16 cc. of propylene glycol and the mixture was stirred again at a temperature of 28–37° C. for 3 hours. 40 lt. of acetone was then added and the stirring was continued for one hour further at room temperature.

The solid was removed by filtration and washed twice with 10 lt. fractions of acetone; the washings were combined with the filtrate and concentrated under reduced pressure below 30° C., to a volume of approximately 5 lt. The aqueous residue was washed three times with 4 lt. portions of hexane and the hexane was discarded. The aqueous residue was then extracted with 2 portions of 3 lt. of methylene dichloride, the extract was washed with water, dried over anhydrous sodium sulfate, and concentrated to a volume of approximately 300 cc., under vacuum and below room temperature.

The concentrated solution was allowed to pass through a column prepared with a mixture of 90 g. of silica and 90 g. of celite. The column was washed with 3 lt. of methylene dichloride and then with a mixture of 900 cc. of methylene dichloride and 100 of acetone. The product was then eluted with mixtures of methylene dichloride and acetone (80:20 and 70:30). The solvents from these elutions was evaporated and the residue crystallized from ethyl acetate. There was thus obtained 6α-chloro-hydrocortisone.

1 g. of 6α-chloro-hydrocortisone was mixed with 10 cc. of pyridine and 1 cc. of acetic anhydride and allowed to stand overnight. It was then poured into ice water, stirred for half an hour at room temperature, and the precipitate was collected, washed with water, dried and recrystallized from acetone-hexane, thus giving the 21-acetate of 6α-chloro-hydrocortisone.

A stirred solution of 500 mg. of the 21-acetate of 6α-chloro-hydrocortisone in 30 cc. of acetic acid was slowly treated with a solution of 130 mg. of chromic acid in 1 cc. of water and 8 cc. of acetic acid and the mixture was kept at room temperature for 2 hours. After pouring into water, the precipitate was filtered, washed with water, dried and recrystallized from acetone-hexane to yield the 21-acetate of 6α-chloro-cortisone.

There was prepared a sporulated culture of *Streptomyces roseo-chromogenus* Rutgers 3689 in an inclined medium of agar containing 1% of glucose and 1% of yeast extract. With 1 cc. of a suspension of this culture there was inoculated each of a series of 250 cc. Erlenmeyer flasks containing 50 cc. of a liquid aqueous medium containing 2% of peptone and 5% of corn syrup, and the mixtures were then incubated in a stirring machine at 28° C., under aeration for 24–48 hours. There was thus obtained a vegetating growing culture of *Streptomyces roseochromogenus* which was used for the subsequent incubation with the steroid.

To the vegetating growing culture of *Streptomyces roseochromogenus* obtained as described in the above preparation there was added the free 6α-chloro-cortisone in the proportion of 10 mg. of the latter for every 50 cc. of culture, which was then stirred at 28° C. for 48 to 72 hours, under aeration. The mixture was then extracted several times with methylene dichloride and the extract was washed with water, dried over anhydrous sodium sulfate, filtered and evaporated to dryness under reduced pressure.

The residue was purified by chromatography on silical gel. After re-esterification with acetic acid anhydride in pyridine there was obtained the 21-acetate of 6α-chloro-16α-hydroxy-cortisone, λ max.: 234 mμ (log ε 4.16) (IA).

In the same manner, the 21-acetate of 6α-chloro-hydrocortisone was saponified and the free alcohol hydroxylated at C–16 and, after re-esterification, there was obtained the 21-acetate of 6α-chloro-16α-hydroxy-hydrocortisone (IA).

PREPARATION II 1.5 g. of the 21-acetate of 6α-chloro-Δ⁴-pregnen-16α,17α,21-triol-3,11,20-trione (IA) obtained as described above in this same preparation, was mixed with 75 cc. of anhydrous t-butanol, 450 mg. of selenium dioxide and 0.2 cc. of pyridine and the mixture was boiled under reflux for 72 hours under an atmosphere of nitrogen. The cooled mixture was diluted with ethyl acetate, filtered through celite and the residue was washed with hot ethyl acetate. The filtrate and washings were combined and evaporated to dryness under reduced pressure. The residue was triturated with water and the precipitate was collected, washed, dried and purified by chromatography on neutral alumina. There was thus obtained the 21-acetate of 6α-chloro-Δ¹,⁴-pregnadien-16α,17α,21-triol-3,11,20-trione (IB).

PREPARATION III

A mixture of 1.5 g. of the above Δ⁴-compound (IA), 2 g. of chroranil and 30 cc. of n-amyl alcohol was refluxed for 16 hours, cooled and diluted with 60 cc. of ether. The solution was successively washed with water, 5% sodium carbonate solution and water, dried over anhydrous sodium sulfate and evaporated to dryness under reduced pressure. Chromatography on ethyl acetate-washed alumina yielded the pure 21-acetate of 6-chloro-Δ¹,⁴,⁶-pregnatrien-16α,17α,21-triol-3,11,20-trione (ID).

PREPARATION IV

A mixture of 5 g. of the 21-acetate of 6α-chloro-Δ⁴-pregnen-16α,17α,21-triol-3,11,20-trione, obtained by the method of Preparation I, 9 g. of chloranil and 250 cc. of tertiary butyl alcohol was refluxed for 12 hours, cooled and diluted with ether. The solution was washed with water, 5% sodium carbonate solution and water, dried over anhydrous sodium sulfate and evaporated to dryness under vacuum. The residue was purified by chromatography on neutral alumina to produce the 21-acetate of 6-chloro-Δ⁴,⁶-pregnadien-16α,17α,21-triol-3,11,20-trione (IC).

1 g. of the above compound (IC) was refluxed with 300 mg. of selenium dioxide, 50 cc. of anhydrous t-butanol and 0.2 cc. of pyridine for 70 hours under an atmosphere of nitrogen. The product was then worked up by the procedure described in Preparation II. There was thus obtained the 21-acetate of 6-chloro-Δ¹,⁴,⁶-pregnatrien-16α,17α,21-triol-3,11,20-trione (ID), identical to the compound (ID) obtained before.

Alternatively, 1 g. of the above Δ⁴,⁶-diene (IC) was refluxed with 1.5 g. of chloranil and 20 cc. of n-amyl alcohol and then the reaction product was worked up as described above in this preparation, thus producing the 21-acetate of 6-chloro-Δ¹,⁴,⁶-pregnatrien-16α,17α,21-triol-3,11,20-trione (ID), identical to the one obtained hereinbefore. In another preparation the n-amyl alcohol was substituted by xylene, with the same final result.

PREPARATION V

By an analogous method to that previously described in Preparation I but starting from 6α-chloro-Δ¹,⁴-pregnadiene-17α,21-diol-3,20-dione, there are obtained the 21-acetate of 6α-chloro-prednisolone, as well as the 21-acetate of 6α-chloro-prednisone, respectively. The latter compound is then further treated as described under Preparation I by microbiologically introducing the 16α-hydroxy group and then is directly obtained the above-mentioned starting compound IB.

PREPARATION VI

The procedure of Preparation I is repeated but hydrogen bromide is used instead of hydrogen chloride as indicated in the first reaction diagram above.

There are obtained the 21 monoacetates of 6α-bromo-Δ⁴-pregnene-16α,17α,21-triol-3,11,20-trione and the corresponding Δ¹,⁴,⁶-analog.

PREPARATION VII

The procedure of Preparation I is repeated with hydrogen bromide instead of hydrogen chloride, and there are obtained the 21 acetate of 6α-bromo-Δ⁴-pregnene-11β,16α,17α,21-tetrol 3,20-dione and the corresponding Δ¹,⁴,⁶-analog.

PREPARATION VIII

A slow stream of dry hydrogen chloride was passed for 2 hours through a mixture of 2 g. of the 21-acetate of 3,20-bis - ethylenedioxy - 5,6 - oxido - pregnan-11β,17α,21-triol and 100 cc. of glacial acetic acid, maintaining the temperature of the mixture below 15° C. The resulting clear solution was poured into ice water and extracted with methylene dichloride. The extract was washed with water, sodium carbonate solution and water, dried over anhydrous sodium sulfate and evaporated to dryness. Two crystallizations of the residue from acetone-hexane afforded the 21-acetate of 6α-chloro-Δ⁴-pregnene-11β,17α,21-triol-3,20-dione.

A mixture of 500 mg. of the above compound, 25 cc. of anhydrous t-butanol, 150 mg. of selenium dioxide and 0.05 cc. of pyridine was refluxed for 70 hours under an atmosphere of nitrogen. The cooled mixture was diluted with 50 cc. of ethyl acetate and filtered through celite, washing well with ethyl acetate. The ethyl acetate solution was evaporated to dryness under vacuum and the residue was triturated with water and collected. The dry precipitate was chromatographed in a column with 25 g. of washed alumina and the crystalline fractions eluted from the column with benzene-ether and ether were combined and crystallized from acetone-hexane, thus yielding the 21-acetate of 6α-chloro-Δ¹,⁴-pregnadiene-11β,17α,21-triol-3,20-dione.

To a vegetating growing culture of *Streptomyces roseochromogenus* Rutgers 3689 obtained as described above in Preparation I there was added 6α-chloro-Δ⁴-pregnene-11β,17α,21-triol-3,20-dione in the proportion of 10 mg. of the latter for every 50 cc. of culture, which was then stirred at 28° C. for 48 to 72 hours, under aeration. The mixture was then extracted several times with methylene dichloride and the extract was washed with water, dried over anhydrous sodium sulfate, filtered and evaporated to dryness under reduced pressure.

The residue was purified by chromatography on silica gel. After re-esterification of the free alcohol there was obtained the 21-acetate of 6α-chloro-Δ⁴-pregnene-11β,16α,17α,21-tetrol-3,20-dione (IA′). The conversion of the latter starting compound IA′ to the other starting compounds IB′, IC′ and ID′ was carried out following the procedure set forth in detail in Preparation I.

PREPARATION IX

The microbiological introduction of a hydroxyl group at C-16 position described in Preparation II was repeated with the 21-acetate of 6α-chloro-Δ¹,⁴-pregnadiene-11β,17α,21-triol-3,20-dione and there was obtained the corresponding 16α-hydroxyl analog (IB′). The conversion of the latter to starting compound ID′ is carried out with chloranil in alcohol or xylene as described under Preparation I.

PREPARATION X

Through a suspension of 2 g. of the 21-acetate of 3-ethylenedioxy - 5α,6α - oxido-pregnan-17α,21-diol-3,11,20-dione in 100 cc. of glacial acetic acid there was passed a slow stream of dry hydrogen chloride for a period of 2 hours while the temperature of the mixture was kept below 15° C. The resulting solution was poured into ice water and the product was extracted with methylene dichloride, washed with water, with sodium carbonate solution and water, dried over anhydrous sodium sulfate and evaporated to dryness. The residue was crystallized twice from acetone-hexane, thus giving 1.48 g. of the 21-acetate of 6α-chloro-Δ⁴-pregnen-17α,21-diol-3,11,20-trione with M.P. 190–192° C., λ max. 233 mμ, log ε 4.10, $[α]_D$ +179° (chloroform).

A suspension of 500 mg. of the latter compound in 25 cc. of anhydrous t-butanol, 150 mg. of selenium dioxide and 0.05 cc. of pyridine was refluxed for 70 hours under an atmosphere of nitrogen. The cooled mixture was diluted with 50 cc. of ethyl acetate and filtered through celite, washing well with ethyl acetate. The ethyl acetate solution was evaporated to dryness under vacuum and the residue was triturated with water and filtered. The dry precipitate was chromatographed in a column with 25 g. of washed alumina and the crystalline fractions eluted with benzene-ether and ether were combined and crystallized from acetone-hexane, thus yielding 105 mg. of the 21-acetate of 6α-chloro-Δ¹,⁴-pregnadiene-17α,21-diol-3,11,20-trione with M.P. 217–219° C., λ max. 238 mμ, log ε 4.18.

The further treatment of the above two resulting compounds is carried out following the same procedure as described in Preparations I, VIII and IX.

PREPARATION XI

A mixture of 6 g. of 6α-fluoro-cortisone, 140 cc. of anhydrous benzene, 48 cc. of ethyleneglycol, distilled over sodium hydroxide, and 0.6 g. of p-toluenesulfonic acid was refluxed for 8 hours with the use of an adapter for the continuous removal of the water formed during the reaction. The cooled mixture was mixed with sodium bicarbonate solution and the organic layer was separated and washed with water, dried over anhydrous sodium sulfate, filtered and evaporated to dryness under reduced pressure. Crystallization of the residue from acetone-hexane yielded the 3,20-bis-cycloethyleneketal of 6α-fluoro-cortisone. The pure product was obtained after recrystallization from acetone-hexane.

5 g. of the above crude ketal was dissolved in 30 cc. of pyridine, mixed with 5 cc. of acetic anhydride and kept overnight at room temperature. After pouring into water the product was extracted with methylene dichloride, washed with water, dried over anhydrous sodium sulfate and evaporated to dryness under reduced pressure. The residue consisted of the 21-acetate of the crude ketal of 6α-fluoro-cortisone.

A solution of 5 g. of the 21-acetate bis-ketal of 6α-fluoro-cortisone (6 - fluoro - 21 - acetoxy-3,20-bis-ethylenedioxy-Δ⁵-pregnen-17α-ol-11-one) in 50 cc. of pyridine was cooled to 0° C. and mixed under stirring with 3.0 cc. of thionyl chloride. The stirring was continued for 1 hour at 0° C. and then the mixture was poured into ice water and the product was extracted with methylene dichloride, well washed with water, dried over anhydrous sodium sulfate, filtered and evaporated to dryness. The residue was purified by chromatography, thus furnishing the 21-acetate of 6-fluoro-3,20-bis-ethylenedioxy-Δ⁵,¹⁶-pregnadien-21-ol-11-one.

5 g. of the above acetate was mixed with 50 cc. of 1% potassium hydroxide in methanol previously cooled to 0° C., and the mixture was stirred at 10° C. under an atmosphere of nitrogen for 1 hour. It was then neutralized with acetic acid and diluted with water. The precipitate was collected, washed with water, dried and purified by crystallization from acetone-hexane, thus giving the pure 6-fluoro-3,20 - bis-ethylenedioxy - Δ⁵,¹⁶-pregnadien - 21-ol-11-one.

A solution of 4 g. of the above compound in 700 cc. of ethanol was treated with 100 cc. of dilute sulfuric acid (8% by volume), refluxed for 40 minutes, cooled and neutralized with solid sodium bicarbonate; the mixture was concentrated to a small volume under reduced pressure and diluted with water. The precipitate was collected by filtration, washed with water, dried and crystallized from acetone-hexane, thus yielding the pure 6α-fluoro-Δ⁴,¹⁶-pregnadien-21-ol-3,11,20-trione.

A solution of 3 g. of the above compound in 60 cc. of anhydrous benzene and 2.8 cc. of pyridine was mixed with 3 g. of osmium tetroxide and the mixture was allowed to stand in the dark at room temperature for 4 days; the osmic ester was then decomposed by the addition of 150 cc. of water, 60 cc. of benzene, 110 cc. of methanol, 18 g. of sodium bicarbonate, with stirring for 4 hours, 200 cc. of chloroform was then added and the dark precipitate was filtered and washed with 800 cc. of hot chloroform. The organic layer was separated from the combined filtrates which was then washed with saturated sodium chloride solution, dried over anhydrous sodium sulfate, filtered and evaporated to dryness under reduced pressure. The residue was triturated with acetone, thus producing 6α-fluoro-16α-hydroxy-cortisone in crude form (6α-fluoro-$\Delta^4$-pregnen-16α,17α,21-triol-3,11,20-trione). Concentration of the mother liquors afforded an additional crop.

1 g. of 6α-fluoro-16α-hydroxy-cortisone was dissolved in 10 cc. of pyridine, cooled to 0° C. and treated with approximately 0.3 cc. (1.1 mols) of acetice anhydride and the mixture was kept at 10° C. for 2 hours and then poured into water. The product was extracted with ethyl acetate, washed with dilute hydrochloric acid, sodium bicarbonate solution and water, dried over anhydrous sodium sulfate and evaporated under reduced pressure. Crystallization of the residue from ethyl acetate yielded the 21-acetate of 6α-fluoro-16α-hydroxy-cortisone (6α-fluoro - $\Delta^4$ - pregnene - 16α,17α,21 - triol - 3,11,20 - trione 21-acetate).

1.5 g. of the 21-acetate of 6α-fluoro-$\Delta^4$-pregnene-16α,17α,21-triol-3,11,20-trione obtained as described above in this preparation, was mixed with 75 cc. of anhydrous t-butanol, 450 mg. of selenium dioxide and 0.2 cc. of pyridine and the mixture was boiled under reflux for 72 hours under an atmosphere of nitrogen. The cooled mixture was diluted with ethyl acetate, filtered through celite and the residue was washed with hot ethyl acetate. The filtrate and washings were combined and evaporated to dryness under reduced pressure. The residue was triturated with water and the precipitate was collected, washed, dried and purified by chromatography on 25 g. of washed neutral alumina. Elution with mixtures benzene-ether and with ether, followed by crystallization of the combined crystalline fractions afforded the 21-acetate of 6α-fluoro-16α-hydroxy-prednisone (6α-fluoro-$\Delta^{1,4}$-pregnadiene-16α,17α,21-triol-3,11,20-trione 21-acetate).

1 g. of this diene was refluxed with 1.5 g. of chloranil and 20 cc. of n-amyl alcohol and then the reaction product was worked up by the procedure described above, thus producing the 21-acetate of 6-fluoro-$\Delta^{1,4,6}$-pregnatriene-16α,17α,21-triol-3,11,20-trione. In another experiment the n-amyl alcohol was substituted by xylene, with the same final result.

PREPARATION XII

A mixture of 2 g. of the 21-acetate of 6α-fluoro-$\Delta^4$-pregnene-16α,17α,21-triol-3,11,20-trione, obtained as described in Preparation XI, 1.6 g. of chloranil and 40 cc. of xylene was refluxed for 12 hours, cooled and diluted with ether. The solution was washed with water, 5% sodium carbonate solution and water, dried over anhydrous sodium sulfate and evaporated to dryness under vacuum. The residue was purified by chromatography on neutral alumina to produce the 21-acetate of 6-fluoro-$\Delta^{4,6}$-pregnadiene-16α,17α,21-triol-3,11,20-trione.

1 g. of the above compound was refluxed with 300 mg. of selenium dioxide, 50 cc. of anhydrous t-butanol and 0.2 cc. of pyridine for 70 hours under an atmosphere of nitrogen. The product was then worked up by the procedure described in the previous preparation. There was thus obtained the 21-acetate of 6-fluoro-$\Delta^{1,4,6}$-pregnatriene-16α,17α,21-triol-3,11,20-trione, identical to the final compound obtained in the preceding preparation.

PREPARATION XIII

A solution of 5 g. of 6-fluoro-3,20-bis-ethylenedioxy-$\Delta^{5,16}$-pregnadien-21-ol-11-one, prepared as described in Preparation V, in 150 cc. of anhydrous tetrahydrofuran was slowly added to a mechanically stirred suspension of 1.5 g. of lithium aluminum hydride in 100 cc. of anhydrous tetrahydrofuran and the mixture was refluxed for 30 minutes. The excess of anhydride was decomposed by the addition of a few drops of acetone and then 15 cc. of saturated aqueous sodium sulfate solution was added, followed by the addition of anhydrous sodium sulfate. The inorganic salts were removed by filtration and the solution was evaporated to dryness. Crystallization of the residue from acetone-ether yielded 6-fluoro-3,20-bis-ethylenedioxy-$\Delta^{5,16}$-pregnadiene-11β,21-diol.

In another experiment the above compound was obtained from the 21-acetate of 6-fluoro-3,20-bis-ethylenedioxy - $\Delta^{5,16}$ - pregnadien-21-ol-11-one, since the reaction with the hydride causes the simultaneous saponification of the acetoxy group at C–21.

The ketal groups of the above compound were then hydrolyzed following the method described in Preparation XI, to give 6α-fluoro-$\Delta^{4,16}$-pregnadiene-11β,21-diol-3,20-dione, which was in turn subjected to the treatment with osmium tetroxide, as described in that preparation, to produce 6α-fluoro-16α-hydroxy-hydrocortisone.

There was then prepared the 21-acetate of 6α-fluoro-16α-hydroxy-hydrocortisone, and then the 21-acetate of 6α-fluoro-16α-hydroxy-prednisolone, following exactly the method of acetylation and dehydrogenation as applied to 6α-fluoro-16α-hydroxy-cortisone.

PREPARATION XIV

A culture of *Streptomyces roseochromogenus* Rutgers No. 3689 was prepared in an inclined agar medium containing 1% of glucose and 1% of yeast extract. 1 cc. of a suspension of this culture was then used to inoculate each one of a series of 250 cc. flasks containing 50 cc. of a sterilized aqueous medium of 2% peptone and 5% corn syrup; the mixtures were then incubated in a shaking machine at 28° C. under aeration for a period of 24–48 hours. There was thus obtained a vegetating growing culture of *Streptomyces roseochromogenus* which was used for the subsequent incubation of the steroid.

10 mg. of 6α-fluoro-cortisone was added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated to dryness under reduced pressure.

The residue was purified by chromatography on silica, thus giving 6α-fluoro-16α-hydroxy-cortisone, identical with that previously obtained.

PREPARATION XV

The procedures of Preparation XI and XII are applied to 6α-methyl-cortisone as the starting material, and there are obtained the 21-acetates of 6α-methyl-16α-hydroxy-cortisone, 6α-methyl-16α-hydroxy-prednisone, 6α-methyl-$\Delta^{4,6}$-pregnadiene-16α,17α,21-triol-3,11,20-trione, and 6α-methyl - $\Delta^{1,4,6}$ - pregnatriene-16α,17α,21-triol-3,11,20-trione, which can be used as starting materials in the process of the present invention.

PREPARATION XVI

The procedure of Preparation XI is applied to 6α-methyl-cortisone as the starting material and there are obtained 6α-methyl - $\Delta^4$ - pregnene-16α,17α,21-triol-3,11,20-trione, the 21-acetate of 6α-methyl-16α-hydroxy-prednisone, 6-methyl-$\Delta^{4,6}$-pregnadiene-16α,17α,21-triol-3,11,20-trione, and 6-methyl-$\Delta^{1,4,6}$-pregnatriene-16α,17α,21-triol-3,11,20-trione.

PREPARATION XVII

The procedure of Preparation XI is applied to 2β-methyl-cortisone as the starting material and there are obtained 2β-methyl-Δ⁴-pregnene-16α,17α,21-triol-3,11,20-trione; the 21-acetate of 2-methyl-16α-hydroxy-prednisone, 2β-methyl-Δ⁴,⁶-pregnadiene-16α,17α,21-triol-3,11,20-trione, and 2-methyl-Δ¹,⁴,⁶-pregnatriene-16α,17α,21-triol-3,11,20-trione.

*Example I*

By conventional methods (cf. for example Organic Syntheses, Coll. Vol. II, 165) there was prepared an ether solution of diazomethane from N-nitroso-N-methyl-urea. To 100 cc. of an ether solution of diazomethane prepared from 25 g. of nitrosomethylurea there was added a solution of 3.5 g. of 16α-hydroxy-cortisone 21-acetate in 200 cc. of methylene chloride, followed by the addition of 1 cc. of an ether solution of fluoroboric acid containing 0.01 molar equivalents of reagent. The mixture was allowed to react at room temperature for 2 hours, then acidified with acetic acid and the solvent was evaporated under reduced pressure in a bath kept at a temperature below 40° C.; crystallization of the residue from acetone yielded 16α-methoxy-cortisone 21-acetate.

*Example II*

In the preceding example, the fluoroboric acid was substituted by 0.01 molar equivalents of boron trifluoride etherate, with exactly the same result.

*Example III*

Example I was repeated, however, acetone was used as the solvent for diazomethane instead of ether. The same results were obtained.

*Example IV*

Example I was repeated with 9α-fluoro-16α-hydroxy-hydrocortisone 21-propionate as the starting material. The final product obtained was 16α-methoxy-9α-fluoro-hydrocortisone 21-propionate.

Following the procedure of the preceding examples, using diazoethane or diazopropane as well as diazomethane, the final products listed in Table I below can be obtained from the indicated starting compounds:

TABLE I

| Example No | Starting Material | Diazo-Agent | Final Product |
|---|---|---|---|
| V | 16α-hydroxy-cortisone 21-acetate. | diazoethane | 16α-ethoxy-cortisone 21-acetate. |
| VI | 9α-fluoro-16α-hydroxy-hydrocortisone 21-propionate. | do | 9α-fluoro-16α-ethoxy-hydro-cortisone 21-propionate. |
| VII | 16α-hydroxy-cortisone 21-acetate. | diazopropane | 16α-propoxy-cortisone 21-acetate. |
| VIII | 9α-fluoro-16α-hydroxy-hydrocortisone 21-propionate. | do | 9α-fluoro-16α-propoxy-hydro-cortisone 21-propionate. |
| IX | 16α-hydroxy-hydrocortisone 21-acetate. | diazomethane | 16α-methoxy-hydro-cortisone 21-acetate. |
| X | do | diazoethane | 16α-ethoxy-hydor-cortisone 21-acetate. |
| XI | do | diazopropane | 16α-propoxy-hydrocortisone 21-acetate. |

*Example XII*

A mixture of 1 g. of 16α-methoxy-cortisone 21-acetate, obtained in accordance with the procedure described in Example I, with 20 cc. of a methanolic solution of sodium methoxide, prepared by dissolving 60 mg. of sodium metal in methanol, was stirred for 1 hour at 0° C. and under an atmosphere of nitrogen. The mixture was then poured into 100 cc. of aqueous saturated sodium chloride solution containing 0.3 cc. of acetic acid and the precipitate was collected by filtration, washed with water, dried and recrystallized from acetone-hexane. There was thus obtained the free 16α-methoxy-cortisone.

A mixture of 800 mg. of the above compound, 5 cc. of pyridine and 1 cc. of propionic anhydride was kept overnight at room temperature, poured into water, heated for half an hour on the steam bath, cooled and the precipitate was collected by filtration. It was washed with water, dried and recrystallized from acetone-hexane, thus affording 16α-methoxy-cortisone 21-propionate.

*Example XIII*

By following the methods of the preceding examples, all of the 16α-hydroxy-hormones esterified at C-21 which may serve as starting compounds in our method, were converted into the corresponding 21-esters of the respective 16α-alkoxy-cortical hormones; the ester group was hydrolyzed and the hydroxyl group at C-21 was eventually reesterified.

Thus we prepared among other compounds those listed in Table II given hereinafter from the starting materials listed therein:

TABLE II

| Example No. | Starting Ester | Final Product |
|---|---|---|
| XIII | 16α-ethoxy-cortisone 21-acetate (Ex. V). | 16α-ethoxy-cortisone. |
| XIV | 16α-ethoxy-cortisone 21-acetate. | 16α-ethoxy-cortisone 21-propionate. |
| XV | 16α-methoxy-hydrocortisone 21-acetate (Ex. IX). | 16α-methoxy-hydrocortisone. |
| XVI | 16α-ethoxy-hydrocortisone 21-acetate (Ex. X). | 16α-ethoxy-hydrocortisone. |
| XVII | 16α-propoxy hydrocortisone 21-acetate (Ex. XI). | 16α-propoxy-hydrocortisone. |
| XVIII | 16α-methoxy-hydrocortisone 21-acetate (Ex. IX). | 16α-methoxy-hydrocortisone 21-clopentylpropionate. |
| XIX | 16α-ethoxy-hydrocortisone (Ex. X). | 16α-ethoxy-hydrocortisone 21-cylcopentylpropionate. |
| XX | 16-αpropoxy-hydrocortisone (Ex. XI). | 16α-propoxy-hydrocortisone 21 cyclopentylpropionate. |
| XXI | 16α-ethoxy-6α,9α-difluoro-prednisone 21-acetate (from the 16α-hydroxy compound by the process described in Ex. I). | 16-ethoxy-6α,9α-difluoro-prednisone. |
| XXII | do | 16α-ethoxy-6α,9α-difluoro-prednisone 21-butyrate. |
| XXIII | 6-methyl-16α-ethoxy-9α-fluoro-Δ¹,⁴,⁶-pregnatriene-11β,17α, 21-triol-3,21-dione 21-acetate (from the 16α-hydroxy compound by the process described in Ex. 1). | 6-methyl-16α-ethoxy-9α-fluoro-Δ¹,⁴,⁶-pregna-triene-11β,17α,21-triol-3,20-dione. |

We claim:
1. A compound having the formula

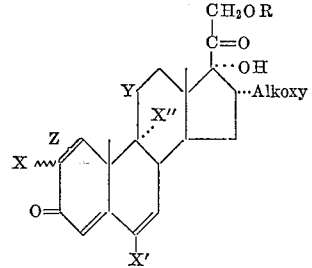

wherein R is selected from the group consisting of hydrogen and hydrocarbon acyl radicals having maximally 12 carbon atoms; X is selected from the group consisting of hydrogen, methyl and ethyl, X' is selected from the group consisting of hydrogen, methyl, fluorine, chlorine and bromine, X" is selected from the group consisting of hydrogen, fluorine, chlorine, and bromine, Y is selected from the group consisting of =O and

and Z is selected from the group consisting of a single bond between C-1 and C-2 and a double bond between C-1 and C-2.

2. 16α-lower alkoxy-6-halo-6-dehydro-cortisone.
3. 16α-lower alkoxy-6-halo-6-dehydro-hydrocortisone.
4. 16α-lower alkoxy-6-halo-6-dehydro-prednisone.
5. 16α-lower alkoxy-6-halo-6-dehydro-prednisolone.
6. 16α-lower alkoxy-6-methyl-6-dehydro-cortisone.

7. 16α-lower alkoxy-6-methyl-6-dehydro-hydrocortisone.
8. 16α-lower alkoxy-6-methyl-6-dehydro-prednisone.
9. 16α-lower alkoxy-6-methyl-6-dehydro-prednisolone.
10. 16α-lower alkoxy-6-dehydro-cortisone.
11. 16α-lower alkoxy-6-dehydro-hydrocortisone.
12. 16α-lower alkoxy-6-dehydro-prednisone.
13. 16α-lower alkoxy-6-dehydro-prednisolone.
14. 16α-lower alkoxy-9α-halo-6-dehydro-prednisolone.
15. 16α-lower alkoxy-9α-halo-6-dehydro-cortisone.
16. 16α-lower alkoxy-6,9α-dihalo-6-dehydro-hydrocortisone.
17. 16α-lower alkyloxy-6,9α-dihalo-6-dehydro-prednisolone.
18. 16α-lower alkoxy-6-methyl-9α-halo-6-dehydro-hydrocortisone.
19. 16α-lower alkoxy-6-methyl-9α-halo-6-dehydro-prednisolone.
20. 16α-lower alkoxy-6-methyl-9α-halo-6-dehydro-cortisone.

References Cited in the file of this patent

UNITED STATES PATENTS 2,946,812   Fried et al. _____ July 26, 1960

OTHER REFERENCES

Fried et al.: Vol. 77, pp. 4181–82 (1955).
Agnello et al.: Vol. 79, pp. 1257–58 (1957), J.A.C.S.